United States Patent
Lee et al.

(10) Patent No.: US 11,889,195 B2
(45) Date of Patent: Jan. 30, 2024

(54) IMAGE SENSING SYSTEM AND OPERATING METHOD THEREOF

(71) Applicant: SK hynix Inc., Gyeonggi-do (KR)

(72) Inventors: Sang Young Lee, Gyeonggi-do (KR); Chul Hoon Kim, Gyeonggi-do (KR); Kyoung Mook Lim, Gyeonggi-do (KR); Keun Soo Cho, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/479,196

(22) Filed: Sep. 20, 2021

(65) Prior Publication Data

US 2022/0210307 A1   Jun. 30, 2022

(30) Foreign Application Priority Data

Dec. 29, 2020  (KR) .................. 10-2020-0185922
Sep. 13, 2021  (KR) .................. 10-2021-0121538

(51) Int. Cl.
*H04N 23/71*   (2023.01)
*H04N 17/00*   (2006.01)

(52) U.S. Cl.
CPC ........... *H04N 23/71* (2023.01); *H04N 17/002* (2013.01)

(58) Field of Classification Search
CPC .... H04N 5/2351; H04N 5/335; H04N 5/2352; H04N 5/2353; H04N 17/002; H04N 5/369; H04N 5/357–3658; H04N 5/243; H04N 23/71–73; H04N 25/57; H04N 25/70; H04N 23/70–76; H04N 25/50; H04N 25/58; H04N 25/89; H04N 25/706
See application file for complete search history.

(56) References Cited

U.S. PATENT DOCUMENTS

| | | | |
|---|---|---|---|
| 7,755,677 B2 * | 7/2010 | Kaplinsky | H04N 5/2353 348/234 |
| 2008/0074517 A1 * | 3/2008 | Chung | H04N 5/2353 348/E5.037 |
| 2009/0128670 A1 | 5/2009 | Noh | |
| 2010/0060794 A1 * | 3/2010 | Kanai | H04N 5/20 348/739 |
| 2014/0306979 A1 | 10/2014 | Chun et al. | |

(Continued)

FOREIGN PATENT DOCUMENTS

| | | |
|---|---|---|
| CN | 101352049 A | 1/2009 |
| CN | 105794216 A | 7/2016 |

(Continued)

OTHER PUBLICATIONS

Office Action for the Chinese Patent Application No. 202111512257.1 issued by the Chinese Patent Office dated Dec. 5, 2023.

*Primary Examiner* — John W Miller
*Assistant Examiner* — Humam M Satti
(74) *Attorney, Agent, or Firm* — IP & T GROUP LLP

(57) ABSTRACT

Disclosed is an image sensing system including an image sensor suitable for generating first actual brightness values corresponding to a captured image; and an image processor suitable for compensating for the first actual brightness values for each brightness period in a single frame period based on compensation information corresponding to a linearity error.

21 Claims, 5 Drawing Sheets

(56) References Cited

U.S. PATENT DOCUMENTS

| | | | | |
|---|---|---|---|---|
| 2016/0105614 A1* | 4/2016 | Kudo | ................... | H04N 5/243 |
| | | | | 348/333.12 |
| 2016/0292834 A1* | 10/2016 | Tsuru | ................... | G06T 5/009 |
| 2017/0118456 A1* | 4/2017 | Lee | ................... | H04N 5/2351 |
| 2018/0041713 A1* | 2/2018 | Gao | ................... | H04N 5/2354 |

FOREIGN PATENT DOCUMENTS

| CN | 109523955 A | 3/2019 |
|---|---|---|
| KR | 10-2105787 B1 | 4/2020 |

\* cited by examiner

IMAGE SENSING SYSTEM AND OPERATING METHOD THEREOF

CROSS-REFERENCE TO RELATED APPLICATION(S)

This application claims priority under 35 U.S.C. § 119 to Korean Patent Application Nos. 10-2020-0185922, filed on Dec. 29, 2020, and 10-2021-0121538, filed on Sep. 13, 2021, the disclosure of which is incorporated herein by reference in its entirety.

BACKGROUND

1. Field

Various embodiments of the present disclosure relate to a semiconductor design technique, and more particularly, to an image sensing system and an operating method thereof.

2. Description of the Related Art

Image sensing systems are devices for capturing images using the property of a semiconductor which reacts to light. Image sensing systems are generally classified into charge-coupled device (CCD) image sensing systems and complementary metal-oxide semiconductor (CMOS) image sensing systems. Recently, CMOS image sensing systems are widely used because the CMOS image sensing systems can allow both analog and digital control circuits to be directly implemented on a single integrated circuit (IC).

SUMMARY

Various embodiments of the present disclosure are directed to an image sensing system having a linear sensitivity characteristic, and an operating method of the image sensing system.

In addition, various embodiments of the present disclosure are directed to an image sensing system for compensating for a sensitivity characteristic by using a simple calculation method, and an operating method of the image sensing system.

In accordance with an embodiment of the present disclosure, an image sensing system may include: an image sensor suitable for generating first actual brightness values corresponding to a captured image; and an image processor suitable for compensating for the first actual brightness values for each brightness period in a single frame period based on compensation information corresponding to a linearity error.

In accordance with an embodiment of the present disclosure, an image sensing system may include: a compensator suitable for determining each brightness period and differently compensating for first actual brightness values, generated by an image sensor, for each brightness period based on a slope difference between an actual slope representing a relationship between an exposure time and an actual brightness value and a reference slope representing a relationship between the exposure time and a reference brightness value; and a controller suitable for calculating the slope difference for each brightness period based on second actual brightness values generated by the image sensor.

In accordance with an embodiment of the present disclosure, an image sensing system may include: an image sensor suitable for generating first and second actual brightness values corresponding to a captured image during first and second periods; a controller suitable for determining an actual slope based on an exposure time and the second actual brightness value, determining a reference slope based on the exposure time and the actual slope, and determining a slope difference between the reference slope and the actual slope; and a compensator suitable for dividing the slope difference into multiple linear functions of multiple brightness periods and compensating for the first actual brightness value for each brightness period using a corresponding linear function among the multiple linear functions.

In accordance with an embodiment of the present disclosure, an operating method of an image sensing system may include: generating one or more test images; calculating an actual slope representing a relationship between exposure times and second actual brightness values and a reference slope representing a relationship between some of the exposure times and some of the second actual brightness values based on second brightness values corresponding to the test images; generating a compensation function based on a slope difference between the actual slope and the reference slope; and differently compensating for first brightness values for each output period based on the compensation function.

In accordance with an embodiment of the present disclosure, an operating method of an image sensing system may include: generating compensation information representing sensitivity of an image sensor, during a first period; and compensating for first actual brightness values generated by the image sensor, for each brightness period based on the compensation information during a second period after the first period.

The compensation information may represent a slope difference for each brightness period between an actual slope related to a linearity error and a reference slope.

The slope difference may be defined as a linear function for each brightness period.

The actual slope may represent a relationship between exposure times and second actual brightness values, and the second actual brightness values may be generated by the image sensor in a test mode period.

The reference slope may represent a relationship between some of the exposure times and some of the second actual brightness values.

DETAILED DESCRIPTION

Various embodiments of the present disclosure are described below with reference to the accompanying drawings, in order to describe in detail the present disclosure so that those with ordinary skill in art to which the present disclosure pertains may easily carry out the technical spirit of the present disclosure.

It will be understood that when an element is referred to as being "connected to" or "coupled to" another element, the element may be directly connected to or coupled to the another element, or electrically connected to or coupled to the another element with one or more elements interposed therebetween. In addition, it will also be understood that the terms "comprises," "comprising," "includes," and "including" when used in this specification do not preclude the presence of one or more other elements, but may further include or have the one or more other elements, unless otherwise mentioned. In the description throughout the specification, some components are described in singular forms, but the present disclosure is not limited thereto, and it will be understood that the components may be formed in plural.

Figure 1:
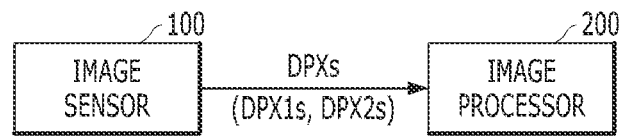
FIG. 1 is a block diagram illustrating an image sensing system in accordance with an embodiment of the present disclosure.

FIG. 1 is a block diagram illustrating an image sensing system in accordance with an embodiment of the present disclosure.

Referring to FIG. 1, the image sensing system may include an image sensor 100 and an image processor 200.

The image sensor 100 may generate actual brightness values DPXs corresponding to a captured image. The image sensor 100 may generate first actual brightness values DPX1s corresponding to an actual image during a frame period, and generate second actual brightness values DPX2s corresponding to a specific image during a specific period. For example, the specific period, which is a period prior to the frame period, may be a test mode period. The specific image may include one or more test images generated during the test mode period.

The image processor 200 may generate or calculate compensation information corresponding to a linearity error, based on the second actual brightness values DPX2s. Further, the image processor 200 may differently compensate for the first actual brightness values DPX1s for each brightness period or each output period, based on the compensation information. The linearity error may refer to a degree of nonlinearity of an actual brightness value with respect to an exposure time that increases linearly. The compensation information, which is information for correcting the linearity error, may refer to a slope difference DS indicated for each brightness period. The slope difference DS is described below (refer to FIG. 4).

Figure 2:
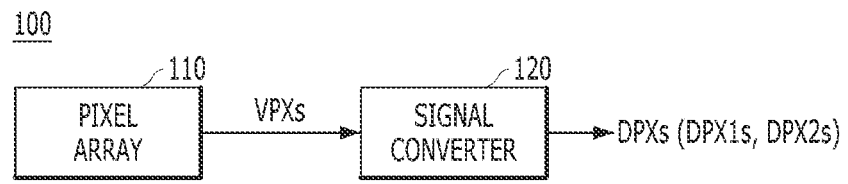
FIG. 2 is a block diagram illustrating an image sensor illustrated in FIG. 1 in accordance with an embodiment of the present disclosure.

FIG. 2 is a block diagram illustrating the image sensor 100 illustrated in FIG. 1 in accordance with an embodiment of the present disclosure.

Referring to FIG. 2, the image sensor 100 may include a pixel array 110 and a signal converter 120.

The pixel array 110 may include a plurality of pixels (not illustrated) arranged in a row direction and a column direction. The pixel array 110 may generate pixel signals VPXs for each row. For example, the pixel array 110 may generate the pixel signals VPXs from pixels arranged in a first row during a first row period of a single frame period, and generate the pixel signals VPXs from pixels arranged in an $n^{th}$ row during an $n^{th}$ row period, where "n" is an integer greater than 2. Each of the pixel signals VPXs may be an analog-type pixel signal.

The signal converter 120 may convert the analog-type pixel signals VPXs into the digital-type brightness values DPXs. For example, the signal converter 120 may include an analog-to-digital converter.

Figure 3:
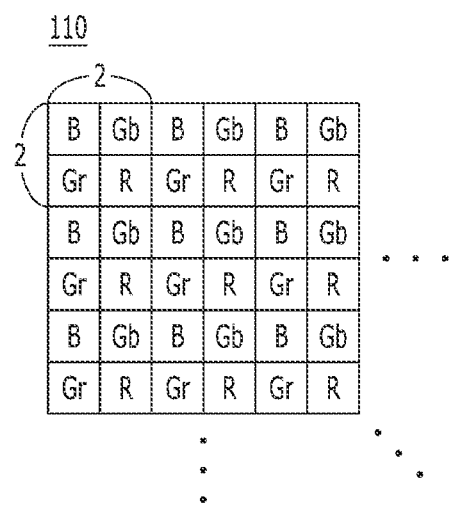
FIG. 3 is a diagram illustrating an example of a pixel array illustrated in FIG. 2 in accordance with an embodiment of the present disclosure.

FIG. 3 is a diagram illustrating an example of the pixel array 110 illustrated in FIG. 2 in accordance with an embodiment of the present disclosure.

Referring to FIG. 3, the pixel array 110 may be arranged in a predetermined pattern. For example, the pixel array 110 may be arranged in a Bayer pattern. The Bayer pattern may be composed of repeating cells each having 2×2 pixels. In each of the cells, two pixels Gb and Gr each having a green color filter may be disposed to diagonally face each other at corners thereof, and a pixel B having a blue color filter and a pixel R having a red color filter may be disposed at the other corners thereof. The four pixels B, Gb, Gr and R are not necessarily limited to the arrangement structure illustrated in FIG. 3, but may be variously disposed according to the Bayer pattern described above.

Figure 4:
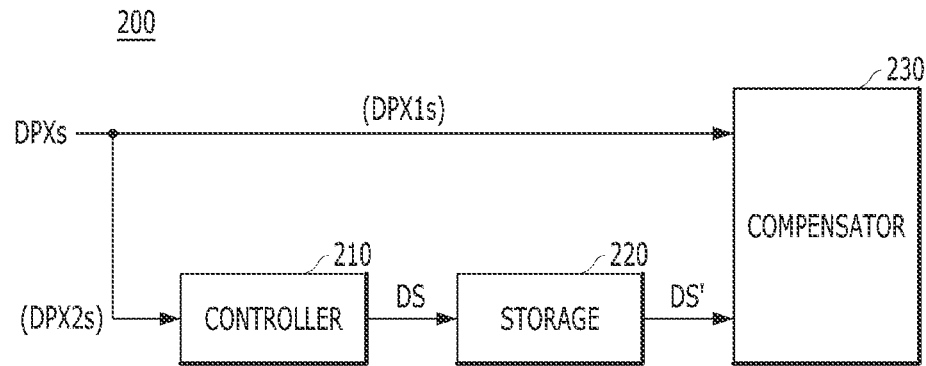
FIG. 4 is a block diagram illustrating an image processor illustrated in FIG. 1 in accordance with an embodiment of the present disclosure.

FIG. 4 is a block diagram illustrating the image processor 200 illustrated in FIG. 1 in accordance with an embodiment of the present disclosure.

Referring to FIG. 4, the image processor 200 may include a controller 210, a storage 220 and a compensator 230.

The controller 210 may calculate the slope difference DS for each brightness period, based on the second actual brightness values DPX2s. The slope difference DS may refer to a deviation for each brightness period between an actual slope RS related to the linearity error and a reference slope IS. The actual slope RS and the reference slope IS may be calculated based on exposure times and the second actual brightness values DPX2s (refer to FIG. 5).

The storage 220 may store the slope difference DS calculated for each brightness period. For example, the storage 220 may include a register or the like.

The compensator 230 may compensate for the first actual brightness values DPX1s for each brightness period based on a stored slope difference DS' outputted from the storage 220.

Figure 5:
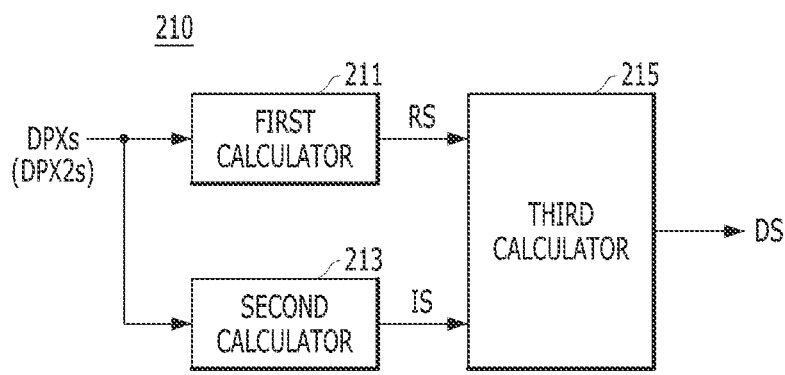
FIG. 5 is a block diagram illustrating a controller illustrated in FIG. 4 in accordance with an embodiment of the present disclosure.

FIG. 5 is a block diagram illustrating the controller 210 illustrated in FIG. 4 in accordance with an embodiment of the present disclosure.

Referring to FIG. 5, the controller 210 may include a first calculator 211, a second calculator 213 and a third calculator 215. The first calculator 211, the second calculator 213, and the third calculator 215 include all circuits, systems, software, firmware and devices necessary for their respective operations and functions.

The first calculator 211 may calculate the actual slope RS indicating a relationship between the exposure times and the second actual brightness values DPX2s. For example, the first calculator 211 may represent, as the actual slope RS, a unit increment of the second actual brightness values DPX2s with respect to a unit increment of the exposure times.

The second calculator 213 may calculate the reference slope IS indicating a relationship between the exposure times and reference brightness values. The reference brightness values may be second actual brightness values included in some brightness periods among the second actual brightness values DPX2s. In the present embodiment, some of the second actual brightness values DPX2s, which may represent linear output for linear input, may be used as the reference brightness values, thereby compensating for the first actual brightness values DPX1s. The reference slope IS may be calculated according to "Equation 1" described below.

$$\frac{PXCODE1 - PXCODE2}{INTGTIME1 - INTGTIME2} \quad \text{[Equation 1]}$$

Herein, "PXCODE1" may refer to the largest brightness value among the second actual brightness values included in the some brightness periods, "PXCODE2" may refer to the smallest brightness value among the second actual brightness values included in the some brightness periods, "INTGTIME1" may refer to an exposure time corresponding to the largest brightness value, and "INTGTIME2" may refer to an exposure time corresponding to the smallest brightness value. That is, the second calculator 213 may calculate the reference slope IS by dividing an increment in the second actual brightness values corresponding to the some brightness periods by an increment in the exposure times corresponding to the some brightness periods.

The third calculator 215 may calculate the slope difference DS for each brightness period based on the actual slope RS and the reference slope IS. For example, the third calculator 215 may calculate deviations in the brightness values between the actual slope RS and the reference slope IS, and represent the slope difference DS for each brightness period as a compensation function, based on the deviations. The compensation function may include a linear function. When the deviations are divided into first to fourth brightness periods, first to fourth linear functions corresponding to the first to fourth brightness periods are calculated, the first to fourth linear functions may be defined as "Equation 2 to 5", respectively, described below.

$$DS = a1x + b1 \quad \text{[Equation 2]}$$

Herein, "x" may refer to a brightness value, and each of "a1" and "b1" may refer to a constant corresponding to the first linear function. However, each of "a1" and "b1" may be a real number.

$$DS = a2x + b2 \quad \text{[Equation 3]}$$

Herein, "x" may refer to a brightness value, and each of "a2" and "b2" may refer to a constant corresponding to the second linear function. However, each of "a2" and "b2" may be a real number.

$$Ds = a3x + b3 \quad \text{[Equation 4]}$$

Herein, "x" may refer to a brightness value, and each of "a3" and "b3" is may refer to a constant corresponding to the third linear function. However, each of "a3" and "b3" may be a real number.

$$DS = a4x + b4 \quad \text{[Equation 5]}$$

Herein, "x" may refer to a brightness value, and each of "a4" and "b4" may refer to a constant corresponding to the fourth linear function. However, each of "a4" and "b4" may be a real number.

Figure 6:
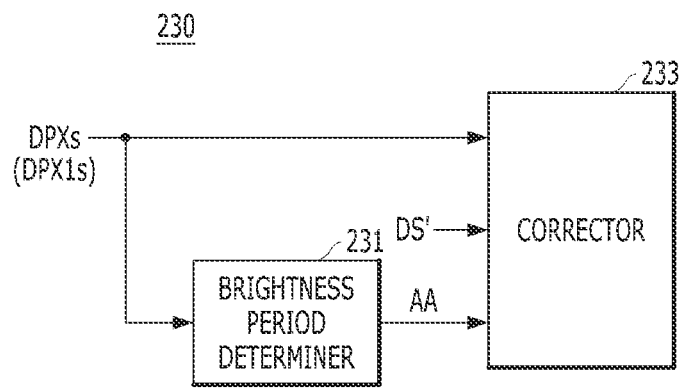
FIG. 6 is a block diagram illustrating a compensator illustrated in FIG. 4 in accordance with an embodiment of the present disclosure.

FIG. 6 is a block diagram illustrating the compensator 230 illustrated in FIG. 4 in accordance with an embodiment of the present disclosure.

Referring to FIG. 6, the compensator 230 may include a brightness period determiner 231 and a corrector 233. The compensator 230, the determiner 231, and the corrector 233 include all circuits, systems, software, firmware and devices necessary for their respective operations and functions.

The brightness period determiner 231 may sort the first actual brightness values DPX1s for each brightness period. For example, the brightness period determiner 231 may determine to which brightness period each of the first actual brightness values DPX1s belongs, and generate a result signal AA corresponding to the determination result.

The corrector 233 may correct the first actual brightness values DPX1s based on the result signal AA and the slope difference DS. For example, the corrector 233 may correct the first actual brightness values DPX1s according to "Equation 6" described below.

$$y = x + a\#x + b\# \quad \text{[Equation 6]}$$

Herein, "y" may refer to a corrected first actual brightness value, "x" may refer to a first actual brightness value, and "a #" and "b #" may refer to constants calculated for each brightness period. For example, the corrector 233 may include a multiplier and an adder.

Hereinafter, an operation of the image sensing system in accordance with an embodiment, which has the above-described configuration, is described.

Figure 7:
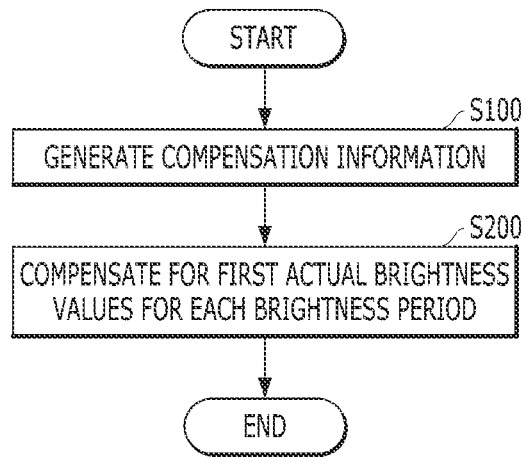
FIG. 7 is a flowchart illustrating an operation of the image sensing system illustrated in FIG. 1 in accordance with an embodiment of the present disclosure.

FIG. 7 is a flowchart illustrating the operation of the image sensing system illustrated in FIG. 1 in accordance with an embodiment of the present disclosure.

Referring to FIG. 7, an operating method of the image sensing system may include operation S100 of generating compensation information indicating sensitivity of the image sensor 100, during a first period, and operation S200 of compensating for the first actual brightness values DPXs, generated by the image sensor 100, for each brightness period based on the compensation information during a second period after the first period. The compensation information may indicate a slope difference for each brightness period between an actual slope RS related to a linearity error and a reference slope IS.

The sensitivity of the image sensor 100 may follow the standard of the International Standard Organization, and be related to a light source, a gain, an integration time and the like. The first period may be a test mode period, and the second period may be a frame period.

Figure 8:
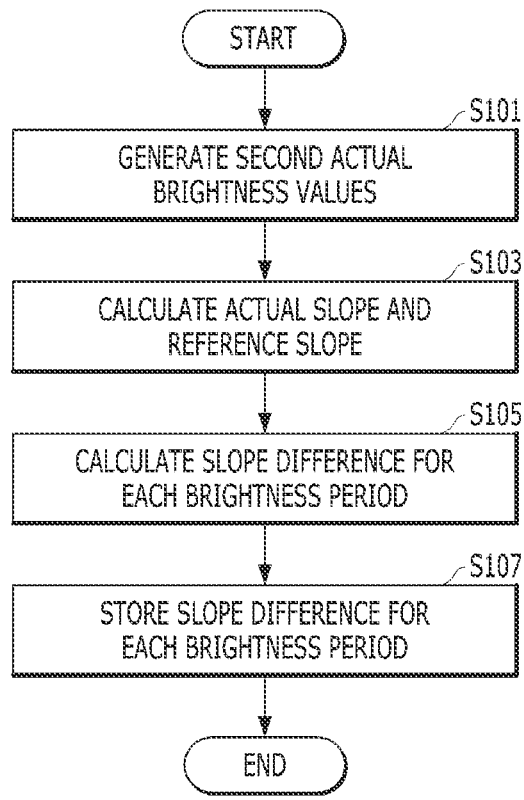
FIG. 8 is a flowchart more specifically illustrating generating compensation information illustrated in FIG. 7 in accordance with an embodiment of the present disclosure.

FIG. 8 is a flowchart illustrating operation S100 of generating compensation information, which is illustrated in FIG. 7 in accordance with an embodiment of the present disclosure.

Referring to FIG. 8, the image sensor 100 may generate the second actual brightness values DPX2s in a predetermined environment, in operation S101. The predetermined environment may include the same light source condition and a condition for increasing the exposure time in a uniform unit. For example, the image sensor 100 may capture a plurality of images while increasing the exposure time in a uniform unit under the same light source condition, and generate the second actual brightness values DPX2s corresponding to each of the plurality of captured images.

The image processor 200 may generate the actual slope RS and the reference slope IS based on the second actual brightness values DPX2s, in operation S103. The actual slope RS may refer to an average brightness value of the second actual brightness values DPX2s with respect to the exposure time. The reference slope IS may be calculated based on a part of the actual slope RS. In some embodiments, the image processor 200 may sort the second actual brightness values DPX2s according to first to third color channels or first to fourth color channels, which correspond to the pixels Gb and Gr each having the green color filter, the pixels B each having the blue color filter and the pixels R each having the red color filter, respectively. Further, the image processor 200 may generate first to third actual slopes and first to third reference slopes or first to fourth actual slopes and first to fourth reference slopes based on the second actual brightness values sorted for each color channel.

The image processor 200 may calculate, for each brightness period, the slope difference DS between the actual slope RS and the reference slope IS in operation S105. For example, the image processor 200 may define the slope difference DS as a linear function for each brightness period. In some embodiments, the image processor 200 may calculate a first slope difference between the first actual slope and the first reference slope for each first brightness period. Further, the image processor 200 may calculate a second slope difference between the second actual slope and the second reference slope for each second brightness period. Furthermore, the image processor 200 may calculate a third slope difference between the third actual slope and the third reference slope for each third brightness period.

The image processor 200 may store the slope difference DS or each brightness period, in operation S107. In some embodiments, the image processor 200 may store the first slope difference for each first brightness period, store the second slope difference for each second brightness period, and store the third slope difference for each third brightness period.

Figure 9:
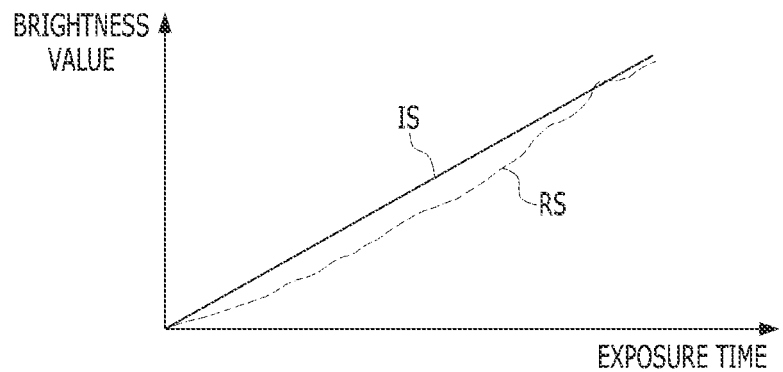
FIG. 9 is a graph illustrating an actual slope and a reference slope in accordance with an embodiment of the present disclosure.

FIG. 9 is a graph illustrating the actual slope RS and the reference slope IS in accordance with an embodiment of the present disclosure.

Referring to FIG. 9, the reference slope IS and the actual slope RS may be represented according to a relationship between an exposure time and a brightness value. The brightness value may refer to an average brightness value of the second actual brightness values DPX2s. The reference slope IS may have a brightness value that constantly increases in response to a constantly increasing exposure time. The actual slope RS may have a brightness value that randomly increases by comparison with a constantly increasing exposure time. That is, the actual slope RS may have a linearity error.

Figure 10:
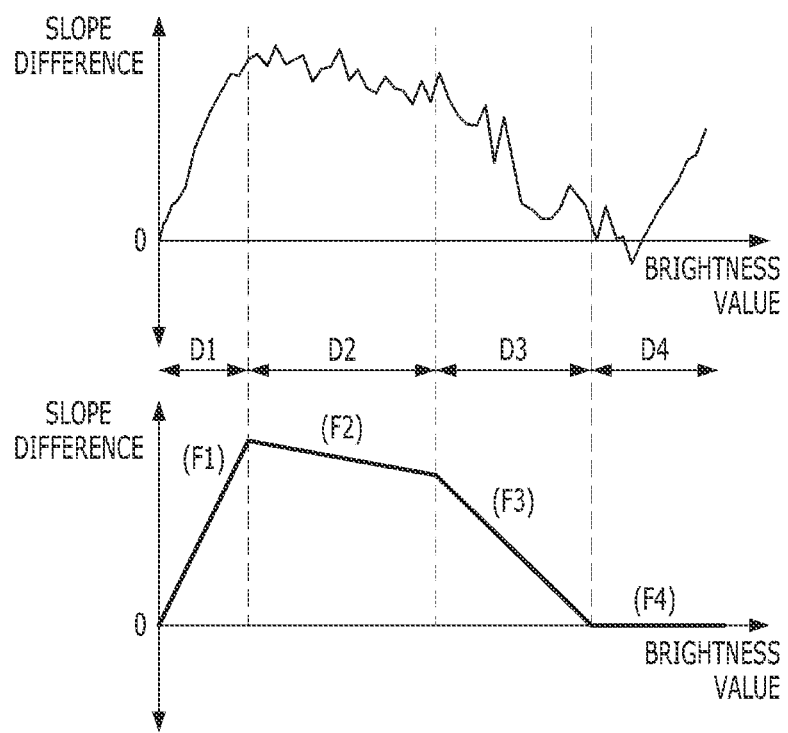
FIG. 10 is a graph illustrating a slope difference in accordance with an embodiment of the present disclosure.

FIG. 10 is a graph illustrating the slope difference DS in accordance with an embodiment of the present disclosure.

Referring to FIG. 10, the image processor 200 may analyze the slope difference DS between the reference slope IS and the actual slope RS. Further, the image processor 200 may regard brightness values showing similar trends as one brightness period according to the analysis result. For example, when the slope difference DS has four trends, the slope difference DS may be defined as first to fourth linear functions F1, F2, F3 and F4 corresponding to first to fourth brightness periods D1, D2, D3 and D4, respectively.

Figure 11:
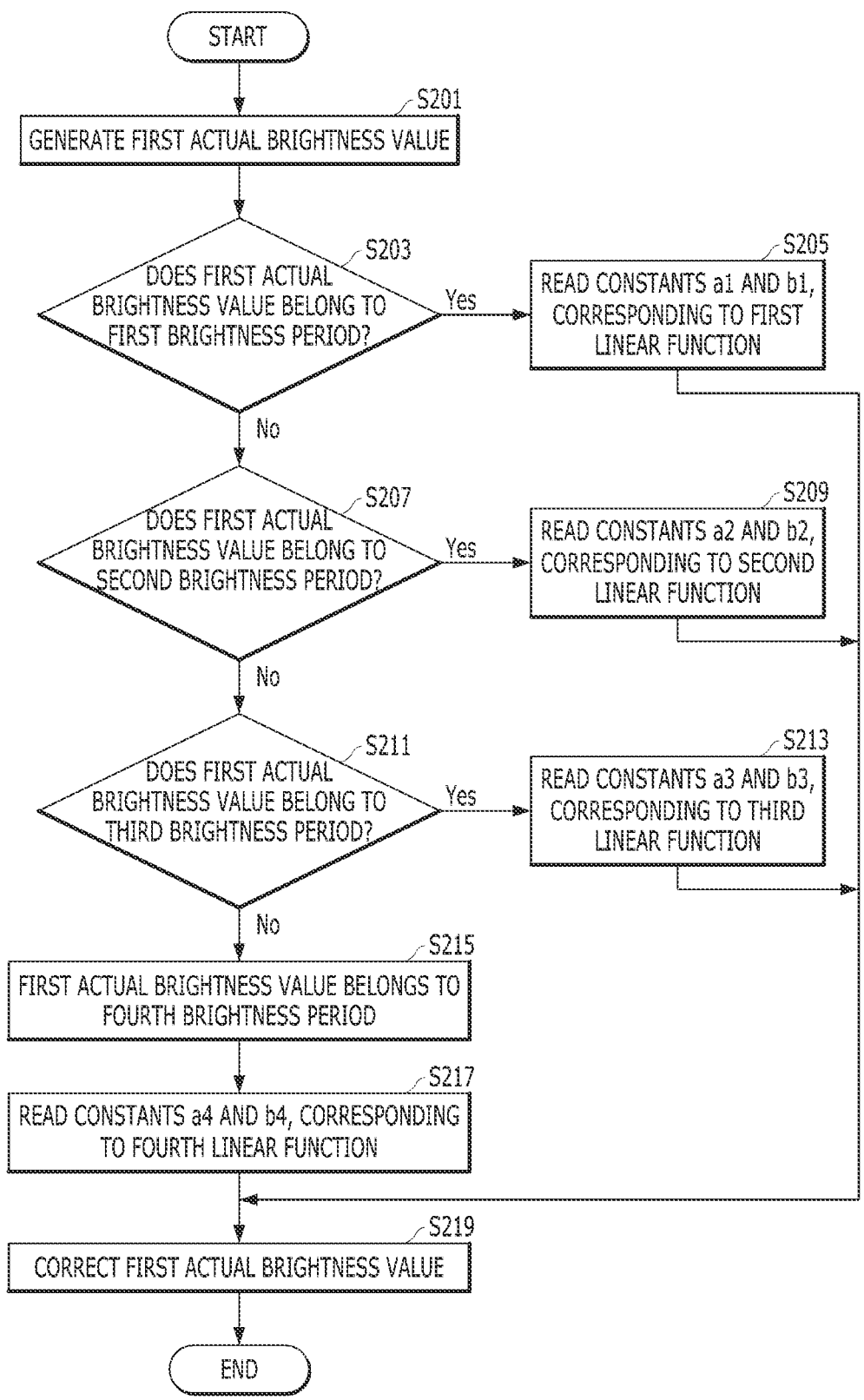
FIG. 11 is a flowchart more specifically illustrating compensating for actual brightness values illustrated in FIG. 7 in accordance with an embodiment of the present disclosure.

FIG. 11 is a flowchart illustrating operation S200 of compensating for the first actual brightness values DPXs, which is illustrated in FIG. 7 in accordance with an embodiment of the present disclosure.

Referring to FIG. 11, the image sensor 100 may generate the first actual brightness values DPX1s corresponding to a captured image, in operation S201. Hereinafter, a process in which one of the first actual brightness values DPX1s is corrected will be representatively described.

The image processor 200 may determine to which brightness period the first actual brightness value belongs, in operations S203, S207 and S211. For example, when it is determined that the first actual brightness value belongs to the first brightness period D1 (that is, "Yes" in operation S203), the image processor 200 may read the constants a1 and b1, corresponding to the first linear function F1, from the storage 220 in operation S205. Further, the image processor 200 may correct the first actual brightness value by applying the constants a1 and b1 to the above-described "Equation 6", in operation S219. When it is determined that the first actual brightness value belongs to the second brightness period D2 (that is, "Yes" in operation S207), the image processor 200 may read the constants a2 and b2, corresponding to the second linear function F2, from the storage 220 in operation S209. Further, the image processor 200 may correct the first actual brightness value by applying the constants a2 and b2 to the above-described "Equation 6", in operation S219. When it is determined that the first actual brightness value belongs to the third brightness period D3 (that is, "Yes" in operation S211), the image processor 200 may read the constants a3 and b3, corresponding to the third linear function F3, from the storage 220 in operation S213. Further, the image processor 200 may correct the first actual brightness value by applying the constants a3 and b3 to the above-described "Equation 6", in operation S219. When it is determined that the first actual brightness value belongs to the fourth brightness period D4 (that is, "No" in operation S211), the image processor 200 may determine that the first actual brightness value belongs to the fourth brightness period D4 in operation S215 and read the constants a4 and b4, corresponding to the fourth linear function F4, from the storage 220 in operation S217. Further, the image processor 200 may correct the first actual brightness value by applying the constants a4 and b4 to the above-described "Equation 6", in operation S219.

In accordance with the aforementioned embodiment of the present disclosure, the image sensing system may have a linear sensitivity characteristic by compensating for actual brightness values having a linearity error, use a simple calculation method such as a linear function, and compensate for a sensitivity characteristic through firmware such as an image processor.

In accordance with the aforementioned embodiment of the is present disclosure, the image sensing system may have a linear sensitivity characteristic, thereby generating a linear brightness value.

Also, in accordance with an embodiment of the present disclosure, the image sensing system may compensate for a sensitivity characteristic through a simple calculation method, thereby minimizing the number of circuits added.

In addition, in accordance with an embodiment of the present disclosure, the image sensing system may compensate for a sensitivity characteristic through a post-processing operation in a digital domain, thereby reducing development cost and design cost, and the image sensing system can be easily compatibly used in various image processing fields.

While the present disclosure has been illustrated and described with respect to specific embodiment, the disclosed embodiment is provided for the description, and not intended to be restrictive. Further, it is noted that the present disclosure may be achieved in various ways through substitution, change, and modification that fall within the scope of the following claims, as those skilled in the art will recognize in light of the present disclosure.

What is claimed is:

1. An image sensing system comprising:
   an image sensor suitable for generating first actual brightness values corresponding to a captured image; and
   an image processor suitable for sorting the first actual brightness values for each brightness period, generating a result signal corresponding to the sorted result, and compensating for the first actual brightness values for each brightness period based on the result signal and compensation information corresponding to a linearity error, wherein the compensation information represents a slope difference for each brightness period between an actual slope and a reference slope.

2. The image sensing system of claim 1, wherein the slope difference is defined as a linear function for each brightness period.

3. The image sensing system of claim 1, wherein the actual slope represents a relationship between exposure times and second actual brightness values.

4. The image sensing system of claim 3, wherein the second actual brightness values are generated by the image sensor in a test mode period.

5. The image sensing system of claim 3, wherein the reference slope represents a relationship between some of the exposure times and some of the second actual brightness values.

6. The image sensing system of claim 1, wherein the image processor sorts the first actual brightness values for each color channel, and compensates for the first actual brightness values based on different pieces of compensation information.

7. The image sensing system of claim 1, wherein the image processor includes:
   a compensator suitable for compensating for the first actual brightness values for each brightness period, based on a slope difference between an actual slope representing a relationship between an exposure time and an actual brightness value, and a reference slope representing a relationship between the exposure time and a reference brightness value; and
   a controller suitable for calculating the slope difference for each brightness period, based on second actual brightness values generated by the image sensor.

8. An image sensing system comprising:
   a compensator suitable for determining each brightness period and differently compensating for first actual brightness values generated by an image sensor, for the each brightness period, based on a slope difference between an actual slope representing a relationship between an exposure time and an actual brightness value and a reference slope representing a relationship between the exposure time and a reference brightness value; and
   a controller suitable for calculating the slope difference for each brightness period based on second actual brightness values generated by the image sensor.

9. The image sensing system of claim 8, wherein the reference brightness values are some of the second actual brightness values.

10. The image sensing system of claim 8, wherein the slope difference is defined as a linear function for each brightness period.

11. The image sensing system of claim 8, wherein the controller includes:
    a first calculator suitable for calculating the actual slope based on the second actual brightness values;
    a second calculator suitable for calculating the reference slope based on the reference brightness values; and
    a third calculator suitable for calculating the slope difference based on the actual slope and the reference slope.

12. The image sensing system of claim 8, wherein the compensator includes:
    a brightness period determiner suitable for sorting the first actual brightness values for each brightness period, and generating a result signal corresponding to the sorted result; and
    a corrector suitable for correcting the first actual brightness values based on the result signal and the slope difference.

13. The image sensing system of claim 8, wherein the corrector includes a multiplier and an adder.

14. The image sensing system of claim 8, further comprising a storage suitable for storing the slope difference for each brightness period.

15. An image sensing system comprising:
    an image sensor suitable for generating first and second actual brightness values corresponding to a captured image during first and second periods;
    a controller suitable for determining an actual slope based on an exposure time and the second actual brightness value, determining a reference slope based on the exposure time and the actual slope, and determining a slope difference between the reference slope and the actual slope; and
    a compensator suitable for dividing the slope difference into multiple linear functions of multiple brightness periods and compensating for the first actual brightness value for each brightness period using a corresponding linear function among the multiple linear functions.

16. An operating method of an image sensing system, comprising:
    generating one or more test images;
    calculating an actual slope representing a relationship between exposure times and second actual brightness values and a reference slope representing a relationship between some of the exposure times and some of the second actual brightness values based on second brightness values corresponding to the test images, and generating a compensation function based on a slope difference between the actual slope and the reference slope; and
    differently compensating for first brightness values for each output period based on the compensation function.

17. The operating method of claim 16, wherein the compensation function may include a linear function.

18. The operating method of claim 16, wherein the each output period may include each brightness period.

19. The operating method of claim 16, wherein the compensating of the first brightness values includes:
    dividing the slope difference into multiple linear functions of multiple brightness periods; and
    compensating for the first brightness values for each output period using a corresponding linear function among the multiple linear functions.

20. The operating method of claim 16, wherein the calculating the actual slope and the reference slope includes:
    calculating the actual slope based on the second brightness values;
    calculating the reference slope based on the some of the second brightness values; and
    calculating the slope difference based on the actual slope and the reference slope.

21. The operating method of claim 16, wherein the compensating of the first brightness values includes:
   sorting the first brightness values for each brightness period;
   generating a result signal corresponding to the sorted result; and
   correcting the first brightness values based on the result signal and the slope difference.

* * * * *